United States Patent

[11] 3,619,758

| | | | |
|---|---|---|---|
| [72] | Inventor | Minas Deranian |  |
| | | Sudbury, Mass. | |
| [21] | Appl. No. | 76,397 | |
| [22] | Filed | Sept. 29, 1970 | |
| [45] | Patented | Nov. 9, 1971 | |
| [73] | Assignee | Honeywell Inc. | |
| | | Minneapolis, Minn. | |

[54] DC VOLTAGE CONVERSION APPARATUS
10 Claims, 2 Drawing Figs.

[52] U.S. Cl................................................ 321/2,
307/60, 321/27 R
[51] Int. Cl.............................................. H02m 3/22
[50] Field of Search........................................ 307/60, 73,
223; 321/2, 27; 328/62

[56] References Cited
UNITED STATES PATENTS

| 3,188,394 | 6/1965 | McMillian, Jr. et al....... | 321/2 X |
|---|---|---|---|
| 3,263,099 | 7/1966 | Bedford........................ | 321/2 |
| 3,320,511 | 5/1967 | Tiemann....................... | 321/2 |
| 3,400,319 | 9/1968 | Stich............................. | 321/2 |
| 3,447,050 | 5/1969 | Geis.............................. | 321/27 |
| 3,521,143 | 7/1970 | Anderson et al.............. | 321/27 X |
| 3,523,239 | 8/1970 | Heard........................... | 321/2 X |
| 3,551,822 | 12/1970 | McNelis........................ | 328/62 |
| 3,559,030 | 1/1971 | Bussard........................ | 321/18 |

*Primary Examiner*—William M. Shoop, Jr.
*Attorneys*—Fred Jacob and Leo Stanger

ABSTRACT: A plurality of DC to DC converter circuits are coupled to respond to pulses occurring at substantially different points in time, each circuit producing a high level DC voltage from a low level DC voltage. The high level DC voltage from each of the converter circuits are coupled to a filter which provides a transient free waveform at an output terminal. The duty cycle provided for each of the converter circuits allows minimal size components to be used while obtaining a high power output.

PATENTED NOV 9 1971 3,619,758

INVENTOR
MINAS DERANIAN

BY John S. Solakian
ATTORNEY

DC VOLTAGE CONVERSION APPARATUS

BACKGROUND OF THE INVENTION

1. Field of the Invention

This invention relates generally to power supplies and more particularly to apparatus for converting a low level DC voltage to a high level DC voltage.

2. Background of the Invention

A DC to DC voltage conversion circuit utilizes an inductor such as in a so-called ringing choke converter and a filter capacitor at the output. As output power requirements increase, so do the physical size of such choke or inductor and capacitor. This increase in size is undesirable where minimum circuit package size is required.

As is well known in the art, transistors may be coupled in parallel to increase power throughout. If this is done with a DC to DC converter circuit, certain limitations are apparent. For example, for high power applications, the choke or inductor increases in size so that in certain cases standard off-the-shelf chokes cannot be used. This increases package size of the converter circuit directly because of the choke size. The choke size may be minimized by turning the converter circuit off for a longer period of time than is necessary to keep the choke out of saturation. If this is done however, the filter capacitor physical size is increased in order to maintain the output voltage.

It is therefore an object of this invention to provide an improved DC to DC voltage converter circuit providing high power, which may be packaged in a minimal physical size utilizing standard components.

SUMMARY OF THE INVENTION

The purposes and objects of this invention are satisfied by providing a frequency source which is decoded to provide pulses on a plurality of control lines, the pulses occurring at substantially different points in time. Each of the control lines is coupled to control one of a plurality of DC to DC voltage converter circuits, for example of the so-called ringing choke design, to produce a high level DC voltage from a lower level DC voltage. The high level DC voltages are generated by each of the converter circuits for a period of time depending on the duty cycle, which duty cycle is determined by the presence of the pulses. The rectified outputs of each converter circuit are coupled together and then filtered and regulated as required.

DESCRIPTION OF THE DRAWINGS

The advantages of the foregoing configuration of this invention will become more apparent upon reading the accompanying detailed description in connection with the figures in which.

DETAILED DESCRIPTION OF THE PREFERRED EMBODIMENT

Figure 1:
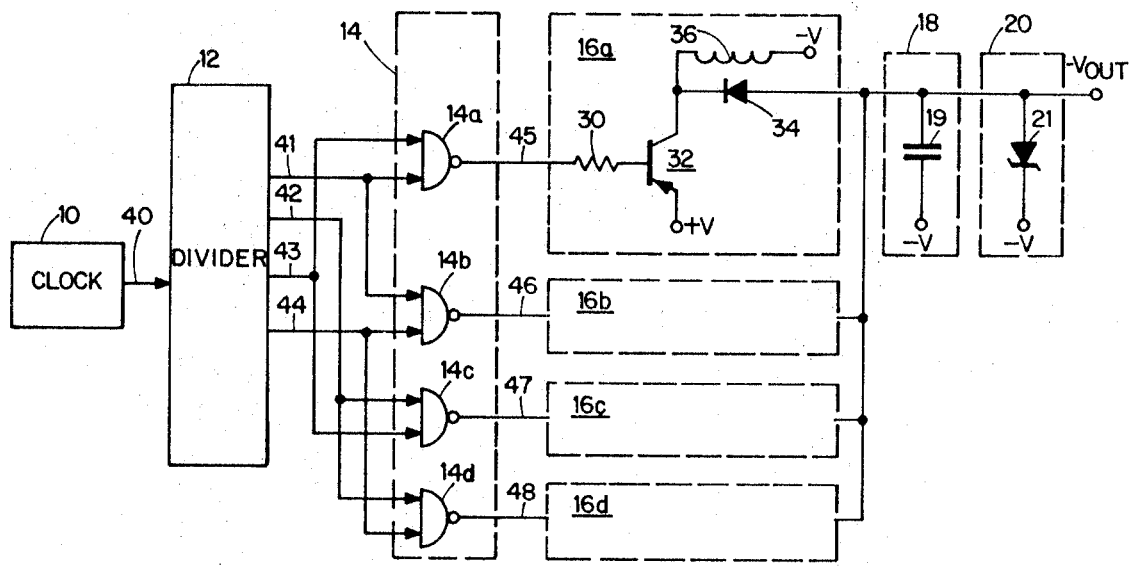
FIG. 1 is a circuit block diagram showing a preferred embodiment of the DC voltage conversion apparatus in accordance with the principles of this invention.
Figure 2:
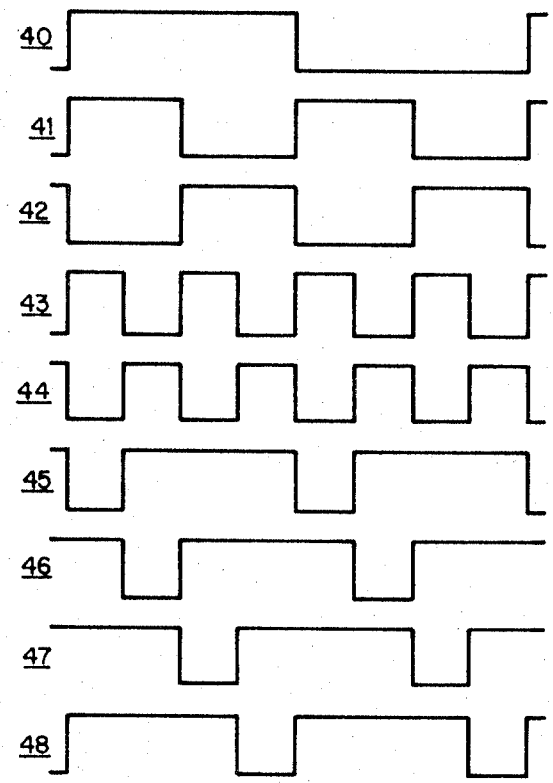
FIG. 2 illustrates timing waveforms in accordance with the operation of the circuit of FIG. 1.

In FIGS. 1 and 2, a clock 10 provides a first frequency waveform on line 40 to divider 12. The clock 10 may be common to the system such as a computer in which the apparatus of this invention is utilized. The divider 12 provides a plurality of waveform outputs depending on the duty cycle desired for the converter circuits 16a through 16d. By way of illustration, the duty cycle for each converter circuit 16a through 16d is 25 percent. Accordingly the number of outputs from divider 12 is four. With an increased number of converter circuits, the number of divider outputs will be increased.

The divider 12 may comprise a well known combination of two flip-flops which produce a second frequency waveform on line 41, the second frequency being one-half that of the first frequency; and the complement of the second frequency waveform on line 42. Divider 12 also produces a third frequency waveform and its complement on lines 43 and 44 respectively, the third frequency being one-fourth of the first frequency.

Each of the lines 41 through 44 from divider 12 are selectively coupled into the NAND gates 14a, 14b, 14c and 14d of a decoder 14. Decoder 14 produces pulses on its output control lines 45 through 48 which appear at substantially different points in time. More specifically the pulses appearing on such output lines are substantially equal in width and do not overlap in time. The width of each pulse is the duty cycle of the respective converter circuits 16a through 16d. The pulses, which by way of example are the low level of the waveforms shown in FIG. 2, are generated for example with reference to that pulse produced on control line 45 when the waveforms appearing on lines 41 and 43 are in the high-voltage state.

The occurrence of the low level pulses on such control lines 45 through 48 turn on the respective converter circuits 16. Converter circuit 16a is shown in detailed configuration for converting a negative voltage $-V$, to a more negative voltage. Circuits 16b, 16c, and 16d, not shown in detail, are similar to circuit 16a. The converter circuit 16a is a so-called ringing choke DC to DC converter and includes a PNP transistor 32 having a positive voltage, $+V$, coupled to its emitter and a resistor 30 connected to receive the pulse on such output lines at one end and connected to the base of transistor 32 at the other end. The collector of transistor 32 is coupled to the cathode of a diode 34 and one end of an inductor 36. The anode of diode 34 is the output of the converter circuit 16a. The other end of the inductor 36 is coupled to a first negative DC voltage, $-V$, which is the low level DC voltage to be converted.

Converter circuit 16a develops at its output, a voltage of greater magnitude than voltage $-V$ due to the flyback caused by choke 36. More specifically, when the low level pulse on line 45 is received at the input resistor 30, transistor 32 turns on into saturation and the collector current through inductor 36 rises linearly with time until the low level pulse on line 45 terminates. At this point, PNP transistor 32 turns off and the energy stored in the collector inductor 36 is released and rectified by diode 34 to the output of converter circuit 16a into filter 18. The outputs of the other converter circuits 16b through 16d are also coupled to filter 18. Thus filter 18 first receives the converted output voltage of circuit 16a and sequentially the outputs of the other circuits 16b and 16c until the output voltage of circuit 16d is received. This cycle repeats so that a continuous DC voltage is provided at filter 18.

Filter 18 may comprise a capacitor 19 coupled at its other end to the first negative DC voltage $-V$. The filtered voltage is then regulated by a regulator 20 which may simply include a Zener diode 21 for clamping the output at the DC voltage, $-V_{out}$. However, other methods of voltage regulation may be utilized. The Zener diode 21 is shown to have its anode coupled to voltage, $-V$. Both the Zener diode 21 and capacitor 19 may have been connected to circuit ground, however, by coupling to voltage $-V$, a higher negative voltage may be obtained.

Having now described the preferred embodiment of the present invention, it can be seen that each of the converter circuits 16a through 16d are activated for a limited duty cycle as desired, the illustrated duty cycle being 25 percent. It can also be appreciated that the number of converter circuits may be increased or decreased depending on the duty cycle desired. Thus the components such as inductor 36 required for each of the circuits 16 may be minimal in both electrical and physical size so that a small overall package size may be utilized. Also the size of filter capacitor 19 may be minimal since the higher level DC voltages generated by circuits 16 are combined so that capacitor 19 need not maintain the output voltage for an excessive period of time. It can also be seen that the specific converter circuit 16 used need not be a ringing choke type as shown with reference to circuit 16a. Any type converter circuit may be used as for example those converter circuits shown in the book entitled "Transistor Inverters and Conver- ters," Thomas Roddam, D. Van Nostrand Co., Inc. 1963. It can also be seen that the pulses supplied on lines 45 through 48 may be conveniently supplied by the system such as a computer in which the apparatus of the invention is utilized. Additionally it can be seen that the apparatus of the invention may be utilized for converting positive DC voltages by appropriate changes in the supplied voltages and by utilizing an NPN transistor in circuits 16 for example.

Having now described the invention, what is claimed as new and novel and for which it is desired to secure Letters Patent is:

1. Voltage conversion apparatus comprising:
    A. means for generating a plurality of pulses on a plurality of control lines, said pulses occurring at substantially different points in time;
    B. a plurality of DC to DC converter circuits each coupled to one of said control lines, said circuits coupled to receive a first DC voltage and generating a second DC voltage in response to said pulses; and
    C. filter means coupled to receive said second DC voltage generated by each of said circuits for providing a filtered DC voltage at an output terminal.

2. Apparatus as defined in claim 1 wherein the duty cycle during which said circuits generate said second DC voltage is decreased proportionally as the number of said circuits is increased.

3. Apparatus as defined in claim 2 wherein said pulses are substantially equal in width.

4. Apparatus as defined in claim 3 wherein said pulses do not overlap in time.

5. Apparatus as defined in claim 1 wherein said converter circuits are ringing choke DC to DC converter circuits.

6. Apparatus as defined in claim 1 wherein said means for generating said plurality of pulses comprises:
    A. clock means for generating a waveform having a first frequency;
    B. means for dividing said first frequency waveform and producing waveforms of a second frequency and its complement and producing waveforms of a third frequency and its complement, said second and third frequency being one-half and one-fourth respectively of the frequency of said first frequency waveform; and
    C. decoder means responsive to said second and third frequency waveforms for generating pulses on said control lines, said pulses
        1. being substantially equal in width, and
        2. not overlapping in time.

7. Apparatus as defined in claim 6 further comprising means for regulating said filtered DC voltage at a predetermined value.

8. Apparatus as defined in claim 6 wherein said converter circuits are ringing choke DC to DC converter circuits.

9. Apparatus as defined in claim 1 wherein the number of said input lines is equal to the number of said converter circuits, wherein said second DC voltage is greater in magnitude than said first DC voltage, and further comprising means for regulating said filtered DC voltages at a predetermined value.

10. Apparatus as defined in claim 9 wherein said filter means includes a capacitor and wherein said means for regulating includes a Zener diode.

* * * * *